US 7,553,879 B2

(12) United States Patent
Laginess et al.

(10) Patent No.: US 7,553,879 B2
(45) Date of Patent: Jun. 30, 2009

(54) COATING COMPOSITION CURABLE WITH ULTRAVIOLET RADIATION

(75) Inventors: Thomas J Laginess, Temperance, MI (US); Hans Kempf, Swanton, OH (US); Jennifer R Stewart, Dearborn, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 12/035,148

(22) Filed: Feb. 21, 2008

(65) Prior Publication Data

US 2008/0138531 A1  Jun. 12, 2008

Related U.S. Application Data

(63) Continuation of application No. 10/686,870, filed on Oct. 15, 2003, now abandoned.

(60) Provisional application No. 60/477,413, filed on Jun. 10, 2003.

(51) Int. Cl.
*C08J 3/28* (2006.01)
*C09D 4/02* (2006.01)
*C09D 133/14* (2006.01)

(52) U.S. Cl. .............................. 522/2; 522/64; 522/75; 522/83; 522/173; 522/44

(58) Field of Classification Search .................. 522/81, 522/96, 173; 427/514
See application file for complete search history.

(56) References Cited

U.S. PATENT DOCUMENTS

| 5,407,972 | A | 4/1995 | Smith et al. |
| 5,559,163 | A | 9/1996 | Dawson et al. |
| 6,017,640 | A | 1/2000 | Muthiah et al. |
| 6,162,511 | A | 12/2000 | Garnett et al. |
| 6,432,491 | B1 | 8/2002 | Blatter et al. |
| 6,559,231 | B2 | 5/2003 | Hasegawa et al. |
| 6,605,669 | B2 | 8/2003 | Awokola et al. |
| 6,787,197 | B1 * | 9/2004 | Jaworek et al. ............. 427/508 |
| 6,838,177 | B2 | 1/2005 | Fenn et al. |
| 6,844,029 | B2 | 1/2005 | Okada et al. |
| 6,998,425 | B2 * | 2/2006 | Chisholm et al. ........... 522/182 |
| 7,341,791 | B2 * | 3/2008 | Mirone et al. ............ 428/476.3 |
| 2003/0059555 | A1 | 3/2003 | Fenn et al. |

FOREIGN PATENT DOCUMENTS

| DE | 43 36 748 A | 6/1994 |
| GB | 2 283 975 | 5/1995 |
| WO | WO 92/17337 | 10/1992 |
| WO | WO 01/74499 | 10/2001 |

OTHER PUBLICATIONS

The National Institute of Standards & Technology Guide to SI Units, available at http://physics.nist.gov/Pubs/SP811/appenB9.html, last visited May 18, 2008.
English language version of International Search Report for PCT/US03/37223, filed Nov. 18, 2003, pp. 5.

* cited by examiner

*Primary Examiner*—Susan W Berman
(74) *Attorney, Agent, or Firm*—Harness, Dickey & Pierce, P.L.C.

(57) ABSTRACT

A UV radiation curable primer coating composition curable under a UV radiation emitting lamp or sunlight. The coating demonstrates improved curing time and includes ethylenically unsaturated free radically polymerizable compounds and 0.1% photoinitiator or less.

19 Claims, No Drawings

COATING COMPOSITION CURABLE WITH ULTRAVIOLET RADIATION

CROSS REFERENCE TO RELATED APPLICATIONS

This application is a continuation of U.S. patent application Ser. No. 10/686,870, filed Oct. 15, 2003 now abandoned, which claims priority to Provisional U.S. Patent Application Ser. No. 60/477,413, filed Jun. 10, 2003.

BACKGROUND OF THE INVENTION

Coatings used for the repair of a vehicle surface comprise several layers of different coating compositions such as primer, basecoat and clearcoat. Primer coating compositions are usually the initial coating layer applied in a vehicle coating repair process. The primer may be applied directly to bare metal or to an electrocoated substrate. In refinish applications a primer may also be applied to a substrate having one or more coating layers thereon. It is desirable that the coating cures quickly and that it provide a layer of paint that is sandable with sandpaper or other abrasive to remove imperfections from the coating layer. Typically the thickness of the coating layer is from 25 μm to 100 μm.

One class of coating compositions, well known for use in primers, comprises a hydroxyl functional polymer, such as polyester or acrylic polymer, and a polyisocyanate. These two components react together after application to the substrate to form a polyurethane coating. These compositions are often thus referred to as 2K polyurethane coating compositions, although technically the polyurethane is formed through crosslinking. 2K Polyurethane primers of this general type have been known for at least 20 years.

One problem with using such 2K polyurethane primers is that sufficient time must be allowed for curing to occur before it can be sanded and topcoated. Typically a primer must cure for 2-4 hours at ambient temperature. An additional drawback to polyurethane primers is that they contain relatively high levels of organic solvents. Due to environmental considerations there is a general trend in the coatings industry towards coating compositions with reduced solvent content.

Primer/sealant compositions curable under ultraviolet and thermal conditions are disclosed in PCT/EP00/03401. These coating compositions however require resins with ultraviolet curable groups and thermally curable functionality such as isocyanate functionality. Thermal cure must be applied in addition to the ultraviolet cure to achieve adequate cure of the coating composition, requiring additional energy expenditure and longer curing times.

Primer compositions curable under ultraviolet conditions only are disclosed in WO-01/74499 A1. This application discloses a primer coating and process for applying a primer coating to a substrate. This coating cures only under ultraviolet light.

The present invention provides a primer coating composition curable under natural outdoor light or by ultraviolet lamp radiation. The coating dries quickly, is sandable and provides adhesion to bare metal, as well as corrosion and humidity resistance.

SUMMARY OF THE INVENTION

This invention relates to a primer composition and a method of applying a primer composition to a substrate. The present invention provides a primer composition that can be cured by exposure to UV radiation having a very low UV-B content and substantially no UV-C content or under natural outdoor light within 2 to 5 minutes. The primer provides a tack free surface after curing under these conditions and exhibits good sanding characteristics, good hiding, and provides adhesion to cold rolled steel as well as e-coated substrates and substrates having aged coatings thereon.

The primer coating composition comprises: A one or more compounds containing one ethylenically unsaturated free-radically polymerizable group per molecule; B) one or more compounds containing two or more ethylenically unsaturated free radically polymerizable groups per molecule; C) one or more pigments, fillers and/or dyes; D) less than 1.0% of one or more photoinitiators; and compounds selected from volatile organic solvents and customary additives and mixtures thereof.

The process of priming a surface comprises: i) applying a UV radiation curable primer to the area to be primed; ii) exposing the primer to natural outdoor light or UV radiation provided by one or more UV lamps. The primer cures within 2 to 5 minutes under natural outdoor light or by UV radiation provided by one or more UV lamps having a UV-B:UV-A ratio of 1:1 or less and substantially no UV-C content. In one embodiment the process can be operated easily and safely in a typical automotive refinish bodyshop. The process is adaptable to an OEM coating application environment as well. Little or no organic solvent is emitted during the application and cure of the primer and the primer can be applied and cured to a non-tacky finish in a very short time.

DETAILED DESCRIPTION

This invention relates to a primer composition and a method of applying a primer composition to a substrate. The UV radiation curable primer comprises: component A comprising one or more compounds containing one ethylenically unsaturated free-radically polymerizable group per molecule, present in an amount between 5-50% by weight, more preferably 10 to 40% by weight and most preferably 25 to 35% by weight; component B) comprising one or more compounds containing two or more ethylenically unsaturated free radically polymerizable groups per molecule present in an amount between 5-50% by weight, more preferably from 10-40% by weight and most preferably from 25 to 35% by weight; component C) comprising one or more pigments, fillers and/or dyes is present in an amount from 1-60% by weight, more preferably from 10 to 60% by weight; component D) comprising one or more photoinitiators is present in an amount from 0.1 to 0.98% by weight, more preferably form 0.1 to 0.95% by weight; component E) comprising volatile organic solvent is optionally present in an amount from 0-20% by weight; and component F) comprising customary additives is present in an amount between 0.1-20% by weight, more preferably from 0.1 to 15% by weight and most preferably from 0.1 to 10% by weight. All amounts are based on total coating composition weight. All ranges of amounts are intended to include each and every point within the range.

In general, the type and level of component A are chosen to give the composition a suitable viscosity and to dissolve components B and D. The choice and level of component A also affects the hardness of the coating. The type and level of component B is chosen to provide suitable adhesion, flexibility, hardness and solvent resistance. Preferably the ethylenically unsaturated groups in component A and component B are principally acrylate groups as this results in rapid cure rate.

Examples of compounds suitable as component A are alpha-beta unsaturated aliphatic compounds such as 1-octene, 1-hexene and 1-decene, vinyl esters such as vinyl acetate, styrene, substituted styrenes such as alpha-methylstyrene or p-methylstyrene, esters of methacrylic acid and esters of acrylic acid. Preferably component A is selected from alkyl esters of acrylic acid such as butyl acrylate, t-butyl acrylate, isobornyl acrylate, isodecyl acrylate, 2-ethylhexyl acrylate, lauryl acrylate, cyclohexyl acrylate and octyl acrylate. More preferably component A comprises isobornyl acrylate and/or 2-ethylhexyl acrylate.

Examples of compounds suitable as component B include diacrylates such as hexanediol diacrylate or tripropyleneglycol diacrylate, triacrylates such as trimethylolpropane triacrylate, alkoxylated trimethylolpropane triacrylate or pentaerythritol triacrylate, polyacrylates such as pentaerythritol tetraacrylate or dipentaerythritol hexaacrylate, urethane acrylates such as Ebecryl 8402, or Ebercryl 8301 available from UCB Chemicals or Actilane 251 available from Akcros Chemicals or unsaturated polyesters such as polyesters prepared with maleic anhydride as one of the monomeric components. Preferably component B comprises one or more urethane acrylates, more preferably component B comprises a mixture of di- and poly-functional urethane acrylates.

In principle component C may be any known pigment or filler. Conventional pigments such as titanium dioxide iron oxide, lithopone and zinc oxide can be included.

Suitable fillers include clays, barytes, mica, talcs, zinc sulfate, calcium sulfate and calcium carbonate. Component C can include those pigments known to inhibit corrosion such as strontium chromate, zinc phosphate and barium metaborate. Preferred pigments and fillers are those that do not interfere substantially with the radical cure. Preferably component C comprises zinc phosphate, barium sulphate, and talc.

The types and levels of pigments are chosen principally in order to achieve excellent sandability and corrosion resistance, while providing minimum cure time under outdoor natural light conditions or under ultraviolet lamp exposure conditions as specified herein. Preferably the levels and types of pigments and fillers are chosen to achieve a pigment to binder ratio of between 0.8 and 2.0, most preferably between 1.2 and 1.8.

Primer compositions containing preferred pigments are often transparent or translucent. In many cases it is desirable if the thickness of the coating can be estimated during application. One way of achieving this is to include a dye in the composition. Suitable dyes include metal complex dyes such as the Zapon(R) range available from BASF Aktiengesellschaft. When a dye is present, it is preferably present at a level of 0.005-1% by weight based on the total composition, more preferably 0.02-0.05%. An alternative way of achieving this is to include a metal flake pigment in the composition. Suitable metal flake pigments include aluminium flake pigments such as the Stappa range available from Eckart-Werke. When metal flake pigment is present, it is preferably present at a level of 0.1-10% by weight based on the total composition, more preferably 0.25-1%.

Component D can be any photoinitiator(s) capable of generating free radicals when exposed to radiation having a UV-B:UV-A ratio of 1:1 or less. Preferably the photoinitiator(s) are capable of generating free radicals when exposed to radiation having a UV-B:UV-A ratio is 0.2:1 or less, more preferably 0.05:1 or less and even more preferably 0.025:1 or less. Preferred photoinitiators include acyl phosphine oxides, for example Irgacure 819 or benzyl ketals such as Irgacure 651, available from Ciba Specialty Chemicals. Preferably the primer contains 0.1% to 0.98% by weight of component D.

The volatile organic solvent can be any solvent which will dissolve components A, B, D and F. It can be an aliphatic or an aromatic hydrocarbon such as Solvesso 100®, a mixture of aromatic solvents having an aromatic solvent content of 99.5% by weight and comprising primarily C9-10 dialkyl and trialkyl benzenes. Also suitable are toluene or xylene, alcohols such as n-butanol or isopropanol, esters such as iso-butyl acetate, n-butyl acetate, n-propyl acetate, methyl acetate or ethyl acetate, ketones such as acetone, methyl isobutyl ketone or methyl ethyl ketone, ethers, ether-alcohols or ether-esters such as ethyl 3-ethoxypropionate, propylene glycol methyl ether, propylene glycol ethyl ether, propylene glycol n-propyl ether or propylene glycol t-butyl ether or a mixture of any of these. Preferably one or a combination of acetone, methyl ethyl ketone, ethyl 3-ethoxypropionate and n-butyl acetate are utilized.

The level and type of solvent used will depend on the viscosity of the other components and the intended application method. In a preferred embodiment the primer contains no volatile organic solvent.

The primer composition may also contain, as component F, conventional additives such as photosynergists, adhesion promoters, pigment dispersants, flow aids, wetting aids and rheology modifiers.

The process of priming a surface (preferably a vehicle or vehicle component) comprises; i) applying a UV radiation curable primer to the area to be primed; ii) curing the primer with natural light or UV radiation provided by one or more UV lamps.

The primer composition is cured by exposure to UV radiation. When several applications of primer are used, the primer can be cured after each application or only after the final application. The ratio of UV-B content to UV-A content of the radiation is 1:1 or less. Preferably the UV-B to UV-A ratio is 0.2:1 or less, more preferably 0.05:1 or less and even more preferably 0.025:1 or less. The radiation has substantially no UV-C content. UV-A radiation is any radiation falling within the 320-400 nm wavelength interval, UV-B radiation is any radiation falling within the 280-320 nm wavelength and UV-C radiation is any radiation falling within the 200-280 nm wavelength interval.

The UV light source applied has intensity ranges as follows: UVA intensity is from 0.8 to 1.6 Joules/cm$^2$, the UVB intensity is from 0.001 to 0.5 Joules/cm$^2$ and the UVC intensity is from 0.001 to 0.3 Joules/cm$^2$.

The radiation may be provided by any suitable UV lamp and preferably the lamp(s) are positioned so that they are between 5 and 60 cm away from the surface of the primer. More preferably the lamp(s) are positioned so that they are from 10 to 30 cm away from the surface of the primer.

When the primer is cured by exposure to natural outdoor light to cure, preferably the primer is exposed to the natural outdoor light for 1 to 10 minutes. Outdoor natural light providing curing conditions have an intensity of from 5 to 100 mJoules/cm$^2$. In one embodiment the coating cured to a non-tacky surface after 5 minute exposure to outdoor light having an intensity of 45-65 mJoules/cm$^2$.

When the primer is cured by lamp radiation, exposure to the lamp radiation is for from 30 seconds to 10 minutes, more preferably from 1 to 3 minutes. Alternatively, the primer may be cured by exposure to a combination of both natural outdoor light and UV lamp radiation. The outdoor visible light has a wavelength of between 320 and 430 nm.

The spectral output of a given radiation source can be measured with an energy dispersive spectrograph comprising a monochrometer and light detector whose sensitivity is known at the relevant wavelengths. The ratio of UB-B:UV-A is arrived at by integrating the intensities of spectral output in the respective wavelength ranges. An example of a suitable instrument is the model 440 spectrometer available from Spectral Instruments, Tucson Ariz., USA.

Following cure, the primer can be sanded using sand- or glasspaper prior to topcoating. If any sticky uncured surface layer exists, it is removed by wiping the surface of the primer with a volatile organic cleaning solvent prior to optionally sanding and topcoating. The volatile organic cleaning solvent can be an aliphatic or aromatic hydrocarbon such as Solvesso 100(R), toluene or xylene, an alcohol such as n-butanol or isopropanol, an ester such as butyl acetate or ethyl acetate, a ketone such as acetone, methyl isobutyl ketone or methyl ethyl ketone, an ether, an ether-alcohol or an ether-ester, water or a mixture of any of these.

The primer may be topcoated with any suitable refinish system in order to achieve the desired final color and appearance. For example the primer can be coated with a waterborne basecoat such as Glasurit L-90 available from BASF, followed by application of a soventborne urethane clearcoat such as 923-450 available from BASF. Alternatively the primer can be topcoated with a solventborne basecoat such as Glasurit L-55 available from BASF, followed by application of a soventborne urethane clearcoat such as 923-450 available from BASF. Alternatively it can be topcoated with a solventborne single layer urethane topcoat such as Glasurit 22 line available from BASF.

The process is particularly suited to, but not limited to, carrying out spot repairs to damaged vehicles. A spot repair refers to a repair of damage that is limited to small area of a vehicle panel, usually less than 50 cm.

According to the present invention there is also provided a substrate coated or partially coated by the process of the invention.

The invention will now be illustrated by means of the following examples.

EXAMPLES

Example 1

Photoinitiator Solution

The following ingredients were combined with stirring to form the photoinitiator solution: 8.3 grams Irgacure 819 and 1.7 grams Irgacure 651, both photoinitiator compositions available from Ciba and 90 grams acetone.

Example 2

Primer Coating Compositions

A primer paste formulation was prepared as follows:

| Ingredient | Amount (grams) |
|---|---|
| Difunctional Urethane Acrylate[1] | 11.1 |
| Hexafunctional Urethane Acrylate I[2] | 5.6 |
| Hexafunctional Urethane Acrylate II[3] | 5.6 |
| Tripropylene glycol diacrylate | 7.0 |
| Solvent | 6.3 |
| Rheology Control Agent | 0.7 |
| Dispersing Agent | 0.4 |
| Talc | 16.7 |
| Barium Sulfate | 16.7 |
| Zinc Phosphate | 16.7 |

-continued

| Ingredient | Amount (grams) |
|---|---|
| Mono-oxide black | 0.3 |
| Methyl ethyl ketone | 5.7 |

[1]Ebercryl 8402 from UCB Chemicals
[2]Ebercryl 8301 from UCB Chemicals
[3]Developmental Ebercryl from UCB Chemicals The primer was formed by the addition of the primer paste to the following:

| Ingredient | Amount (grams) | | | |
|---|---|---|---|---|
| Primer Paste Formulation | 174.1 | 169.5 | 165.8 | 155.8 |
| Photoinitiator Solution from Ex. 1 | 10 | 15 | 19 | 30 |
| Acetone | 20.0 | 15.0 | 11.0 | — |
| Acidic Adhesion Promoter | 4.3 | 4.3 | 4.3 | 4.3 |

The ingredients were mixed and sprayed over cold rolled steel that had been sanded with 220 grit sandpaper. The films were applied in two coats with a one-minute flash dry between coats. After the second coat was applied, the film was flash dried for 3 minutes then cured with an ultraviolet lamp Panacol 450 for 2 minutes where the substrate was at a distance of 10 inches from the light source.

TABLE 2

Evaluation of Primers for Surface Cure

Following curing as set forth above, the panels were subjected to surface tests as follows. (1) Sand was applied to the coated panel, rating is how much of the area was covered by large sand sphere—(100% is completely covered); (2) cotton balls were pressed on to the panel surface—rating is % of surface covered by cotton ball fibers; (3) paper was placed on a panel and a 100 gram weight applied for one minute—passed if paper fell off, failed if paper stuck to the panel. Test results are as follows

| | Sample | | | |
|---|---|---|---|---|
| | 1 | 2 | 3 | Control* |
| % photoinitiator | 0.5 | 0.75 | 0.95 | |
| | % adherance to surface of panel | | | |
| Sand | 60 | 40 | 20 | 100 |
| Cotton Ball | 15 | 15 | 15 | 80 |
| Paper | passed | passed | passed | Failed |

*UV Primer Surfacer PPG DS1002

Evaluation of Primers for Humidity Resistance and Adhesion

TABLE 2

Evaluation of Primers for Humidity Resistance and Adhesion

| | Sample | | | |
|---|---|---|---|---|
| | 1 | 2 | 3 | Control* |
| % Initial Adhesion | 100 | 100 | 99 | 100 |
| % 7 day Adhesion | 100 | 100 | 100 | 100 |

*UV Primer Surfacer PPG DS1002

Coatings were prepared according to Example 2 and applied to a cold rolled steel (CRS) substrate in two coats with a one-minute flash dry between coats. After the second coat was applied, the film was flash dried for 3 minutes then cured under one of the following conditions:

1. Exposure to daylight in Whitehouse, Ohio on May 6, 2003 at a visible light wavelength of approximately 340-430 nm and intensity of 45-65 mJoules/cm$^2$, for time indicated;
2. Exposure to ultraviolet lamp Panacol 450 (UVA only) for time indicated where the substrate was at a distance of 10 inches from the light source;
3. Exposure to a mixture of UVA/B/C under ultraviolet lamp with a D-bulb, 2 passes, at a UVA intensity of 1.6 Joules/cm$^2$, a UVB intensity of 0.5 Joules/cm$^2$, and a UVC intensity of 0.3 Joules/cm$^2$ per pass.

Adhesion was determined by the X-scribe test, the test score indicating the amount of paint remaining following the test.

Example 3

Primer Cured in Outdoor Natural Light

The following ingredients were mixed together to form the primer composition.

| Ingredient | Amount (grams) |
|---|---|
| Difunctional Urethane Acrylate[1] | 10.6 |
| Hexafunctional Urethane Acrylate I[2] | 5.3 |
| Hexafunctional Urethane Acrylate II[3] | 5.3 |
| Tripropylene glycol diacrylate | 6.7 |
| Solvent | 6.0 |
| Rheology Control Agent | 0.7 |
| Dispersing Agent | 0.35 |
| Talc | 15.9 |
| Barium Sulfate | 15.9 |
| Zinc Phosphate | 15.9 |
| Mono-oxide black | 0.26 |
| Methyl ethyl ketone | 5.4 |
| Acetone | 8.6 |
| DS 3194 | 0.8 |
| Photoinitiator | 0.16 |
| Adhesion promoter | 2.1 |

[1] Ebercryl 8402 from UCB Chemicals
[2] Ebercryl 8301 from UCB Chemicals
[3] Developmental Ebercryl from UCB Chemicals

TABLE 3

Adhesion of Primer to Cold Rolled Steel

| Type of Exposure | Exposure Time (minutes) | Initial Adhesion | Post Humidity Adhesion | 24 Hour Recovery Adhesion |
|---|---|---|---|---|
| Outdoor Natural Light | 5 | 95 | 95 | 99 |
| | 10 | 99 | 99 | 95 |
| | 20 | 95 | 99 | 99 |
| UVA lamp | 2 | 95 | 95 | 95 |
| | 2 | 99 | 99 | 95 |
| UVA/B/C lamp | | 95 | 95 | 95 |
| | | 95 | 90 | 95 |

The invention claimed is:

1. A UV radiation curable primer coating composition comprising:
   (a) one or more compounds containing one ethylenically unsaturated free-radically polymerizable group per molecule;
   (b) 5 to 50% by weight of compounds containing two or more ethylenically unsaturated free radically polymerizable groups per molecule comprising a difunctional urethane acrylate and a hexafunctional urethane acrylate;
   (c) 1.0 to 60% by weight of one or more pigments, fillers and/or dyes;
   (d) 0.1 to 0.95 % photoinitiators;
   (e) 0 to 20% by weight of volatile organic solvent; and
   (f) 0.1 to 10% by weight of additives,
   wherein said coating composition is curable to a non-tacky surface under a UVA radiation emitting lamp within 2 minutes and in sunlight within 5 minutes.

2. A primer coating composition according to claim 1, comprising 0.1 to 0.5% by weight photoinitiators.

3. A primer coating composition according to claim 1 wherein component (a) is selected from the group consisting of butyl acrylate, t-butyl acrylate, isobomyl acrylate, isodecyl acrylate, 2-ethylhexyl acrylate, lauryl acrylate, cyclohexyl acrylate, octyl acrylate.

4. A primer coating composition according to claim 1 wherein component (b) further comprises a member selected from the group consisting of diacrylates, triacrylates, polyfunctional acrylates and mixtures thereof.

5. A primer coating composition according to claim 1 wherein component (b) further comprises a member selected from the group consisting of hexanediol diacrylate, tripropyleneglycol diacrylate, trimethylolpropane triacrylate, alkoxylated trimethylolpropane triacrylate, pentaerythritol triacrylate, pentaerythritol tetraacrylate, dipentaerythritol hexaacrylate, unsaturated polyesters, and mixtures thereof.

6. A primer coating composition according to claim 1 wherein component (b) further comprises tripropylene glycol diacrylate.

7. A primer coating composition according to claim 1 wherein the pigment to binder ratio is between 1.2 and 1.8.

8. A primer coating composition according to claim 1 wherein the photoinitiator comprises a compound selected from the group consisting of acyl phosphine oxides and benzyl ketals.

9. A primer coating prepared by curing the primer coating composition according to claim 1 wherein said primer coating composition is cured to a tack free surface on a metal substrate by 5 minutes' exposure to outdoor light having an intensity of 45-65 mJoules/cm$^2$ and demonstrates 95% post humidity test adhesion.

10. A process for applying a primer coating to a substrate consisting essentially of:
   A. applying a UV radiation curable primer coating composition according to claim 1 to a substrate;
   B. curing the applied coating composition with a source selected from the group consisting of one or more UV lamps having a UV-B:UV-A ratio of 1:1 or less, natural outdoor light having a wavelength between 320 and 430 nm, and mixtures thereof.

11. A process according to claim 10 wherein the coating composition applied comprises 0.1 to 0.5% by weight photoinitiators.

12. A process according to claim 10 wherein the coating composition applied comprises compound A selected from butyl acrylate, t-butyl acrylate, isobornyl acrylate, isodecyl acrylate, 2-ethylhexyl acrylate, lauryl acrylate, cyclohexyl acrylate and octyl acrylate and mixtures thereof.

13. A process according to claim 10 wherein component (b) further comprises a member selected from the group consisting of diacrylates, triacrylates, polyfunctional acrylates and mixtures thereof.

14. A process according to claim 10 wherein component (b) further comprises a member selected from the group consisting of hexanediol diacrylate, tripropyleneglycol diacrylate, trimethylolpropane triacrylate, alkoxylated trimethylolpropane triacrylate, pentaerythritol triacrylate, pentaerythritol tetraacrylate, dipentaerythritol hexaacrylate, unsaturated polyesters, and mixtures thereof.

15. A process according to claim 10 wherein the coating composition applied comprises a pigment to binder ratio between 1.2 and 1.8.

16. A process according to claim 10 wherein a UV light source is applied wherein the UVA intensity is from 0.8 to 1.6 Joules/cm$^2$, the UVB intensity is from 0.001 to 0.5 Joules/cm$^2$ and the UVC intensity is from 0.001 to 0.3 Joules/cm$^2$.

17. A process according to claim 10 wherein the applied coating composition is cured under natural light conditions, said light providing an intensity of 5-100 mJoules/cm$^2$.

18. A process according to claim 10 wherein the substrate to which the coating composition is applied to a substrate comprising an automotive vehicle.

19. A process according to claim 10 wherein the coating process comprises application of the primer coating in the repair of an automotive vehicle.

* * * * *